United States Patent
Sogihara

(10) Patent No.: US 11,186,677 B2
(45) Date of Patent: Nov. 30, 2021

(54) FIBER POWDER AND AQUEOUS DISPERSION THEREOF

(71) Applicant: TEIJIN FRONTIER CO., LTD., Osaka (JP)

(72) Inventor: Kota Sogihara, Osaka (JP)

(73) Assignee: Teijin Frontier Co., Ltd., Osaka (JP)

( * ) Notice: Subject to any disclaimer, the term of this patent is extended or adjusted under 35 U.S.C. 154(b) by 109 days.

(21) Appl. No.: 16/463,540

(22) PCT Filed: Nov. 22, 2017

(86) PCT No.: PCT/JP2017/042701
§ 371 (c)(1),
(2) Date: May 23, 2019

(87) PCT Pub. No.: WO2018/097334
PCT Pub. Date: May 31, 2018

(65) Prior Publication Data
US 2019/0276591 A1 Sep. 12, 2019

(30) Foreign Application Priority Data

Nov. 25, 2016 (JP) .............................. JP2016-228751

(51) Int. Cl.
| | | |
|---|---|---|
| *C08G 63/183* | (2006.01) | |
| *B02C 4/02* | (2006.01) | |
| *B02C 23/36* | (2006.01) | |
| *C08L 67/02* | (2006.01) | |
| *D06H 7/00* | (2006.01) | |
| *D01F 6/62* | (2006.01) | |

(52) U.S. Cl.
CPC .............. *C08G 63/183* (2013.01); *B02C 4/02* (2013.01); *B02C 23/36* (2013.01); *C08L 67/02* (2013.01); *D06H 7/00* (2013.01); *C08L 2201/54* (2013.01); *D01F 6/62* (2013.01)

(58) Field of Classification Search
CPC ......... C08G 63/183; B02C 23/36; B02C 4/02; C08L 67/02; D06H 7/00
See application file for complete search history.

(56) References Cited

U.S. PATENT DOCUMENTS

2011/0052649 A1* 3/2011 Loyen ...................... C09D 7/69
424/401

FOREIGN PATENT DOCUMENTS

| CN | 105482627 A | 4/2016 | | |
|---|---|---|---|---|
| EP | 0432279 A1 | 6/1991 | | |
| EP | 0 665 262 A1 | 8/1995 | | |
| GB | 1569732 A | 6/1980 | | |
| JP | 53-130562 A | 11/1978 | | |
| JP | 6-136611 A | 5/1994 | | |
| JP | 8-162097 A | 6/1996 | | |
| JP | 10-273809 A | 10/1998 | | |
| JP | 2003-181312 A | 7/2003 | | |
| JP | 2006-188790 A | 7/2006 | | |
| JP | 2007-041496 | * | 2/2007 | ............... C03G 9/08 |
| JP | 2007-41496 A | 2/2007 | | |
| JP | 2007-77563 A | 3/2007 | | |
| JP | 2011-184827 A | 9/2011 | | |
| WO | 2004/055250 A1 | 7/2004 | | |
| WO | 2009/101320 A2 | 8/2009 | | |
| WO | 2011/105535 A1 | 9/2011 | | |
| WO | 2014/057740 A1 | 4/2014 | | |

OTHER PUBLICATIONS

Communication dated Jun. 4, 2020 from the European Patent Office in EP Application No. 17874969.3.
Communication dated Jun. 10, 2020 from the European Patent Office in EP Application No. 17874969.3.
International Search Report for PCT/JP2017/042701 dated Jan. 9, 2018 [PCT/ISA/210].
Communication dated Dec. 24, 2020 by the China National Intellectual Property Administration in application No. 201780072907.0.
Liu Ayin, "Agricultural Chemicals Processing Technology", Chemical Industry Publishing Company, 1998, pp. 115-118, 6 pages.
Communication dated Jul. 16, 2021 from the China National Intellectual Property Administration in CN Application No. 201780072907.0.

* cited by examiner

*Primary Examiner* — John E Uselding
(74) *Attorney, Agent, or Firm* — Sughrue Mion, PLLC

(57) ABSTRACT

A fiber powder having a 50% particle diameter ($d_{50}$) of 6 to 60 μm, characterized in that the fiber powder has a maximum particle diameter ($d_{100}$) of 1,000 μm or less. It is preferred that a value (($d_{10} \cdot d_{90}$)/$d_{100}$) obtained by dividing by the maximum particle diameter ($d_{100}$) a value which is obtained by multiplying a 10% particle diameter ($d_{10}$) by a 90% particle diameter ($d_{90}$) is 0.3 to 5.0, that the fiber powder has an extractable component content of 0.2 to 3.0% by weight based on the fiber weight, and that the fiber powder has a water content of 0.2 to 50% by weight. Further, it is preferred that the fiber powder is an organic material, or comprises a thermoplastic resin, and that the thermoplastic resin is a polyester resin or a polyamide resin.

6 Claims, No Drawings

FIBER POWDER AND AQUEOUS DISPERSION THEREOF

CROSS REFERENCE TO RELATED APPLICATIONS

This application is a National Stage of International Application No. PCT/JP2017/042701, filed on Nov. 22, 2017, which claims priority from Japanese Patent Application No. 2016-228751, filed on Nov. 25, 2016.

TECHNICAL FIELD

The present invention relates to a fiber powder having a wide distribution range of the particle diameter and having excellent dispersibility, and an aqueous dispersion thereof.

BACKGROUND ART

As a method for powdering a fiber, for example, as seen in PTL 1, a method has been known in which a wool fiber is fibrillated using a ball mill and then further pulverized using a hammer mill. However, this method has a problem in that fibrillation of the fiber proceeds in the pulverization process, and, when the resultant fiber is dispersed in water, the fiber suffers entanglement so that it is not satisfactorily dispersed.

On the other hand, for example, as seen in PTL 2, there has been known a powder which uses a very ultrafine fiber formed from a thermoplastic polymer as a starting material, and which comprises the very ultrafine fiber obtained by forming particles from a fiber dispersion having the fiber dispersed in a dispersing medium and drying the particles. However, the obtained powder has a shape close to a sphere, despite the starting material being in a fibrous form, and thus has only a limited fiber reinforcement effect.

Further, as a conventional method for cutting a continuous fiber spun from a synthetic fiber or the like into a short fiber, a method in which a fiber is cut using a rotary cutter or a guillotine cutter has been known. For example, PTL 3 discloses a technique in which a nylon continuous fiber is cut using a guillotine cutter into a short fiber form; however, only a fiber having a fiber length as large as 400 μm can be obtained due to a limit of the capacity of the cutter. Thus there can be obtained only a short fiber which is relatively long such that it is difficult to disperse the fiber.

CITATION LIST

Patent Literature

PTL 1: JP-A-10-273809
PTL 2: JP-A-2007-77563
PTL 3: JP-A-6-136611

DISCLOSURE OF INVENTION

Technical Problem

The present invention has been made in view of the above-mentioned background, and an object of the invention is to provide a fiber powder which maintains a fibrous form and has a particle diameter distribution, and which exhibits excellent dispersibility, and an aqueous dispersion thereof.

Solution to Problem

The invention is directed to a fiber powder having a 50% particle diameter ($d_{50}$) of 6 to 60 μm and having a maximum particle diameter ($d_{100}$) of 1,000 μm or less.

It is preferred that a value (($d_{10} \cdot d_{90}$)/$d_{100}$) obtained by dividing by the maximum particle diameter ($d_{100}$) a value which is obtained by multiplying a 10% particle diameter ($d_{10}$) by a 90% particle diameter ($d_{90}$) is 0.3 to 5.0, that the fiber powder has an extractable component content of 0.2 to 3.0% by weight based on the fiber weight, and that the fiber powder has a water content of 0.2 to 50% by weight.

Further, it is preferred that the fiber powder is an organic material, or comprises a thermoplastic resin, and that the thermoplastic resin is a polyester resin or a polyamide resin.

The invention encompasses a method for producing the above-mentioned fiber powder, which comprises placing a raw material fiber between a pair of metal rolls which are rotating to subject the raw material fiber to compressive pulverization treatment. Further, in the method for producing the fiber powder, it is preferred that water is added during the compressive pulverization treatment, and that, after the compressive pulverization treatment, the resultant material is further subjected to finely powdering treatment.

The fine fiber aqueous dispersion which is another embodiment of the invention is characterized by having the above-mentioned fiber powder of the invention dispersed in water.

Advantageous Effects of Invention

In the invention, there are provided a fiber powder which maintains a fibrous form and has a particle diameter distribution, and which exhibits excellent dispersibility, and an aqueous dispersion thereof.

DESCRIPTION OF EMBODIMENTS

The fiber powder of the invention is a fiber powder having a particle diameter ($d_{50}$) of 6 to 60 μm, wherein the fiber powder has a maximum particle diameter ($d_{100}$) of 1,000 μm or less.

The raw material for the fiber powder of the invention is preferably an organic material. The raw material may be, for example, a natural fiber, such as wool, as long as the raw material maintains a fibrous form before being formed into a powder, but the raw material is preferably a synthetic fiber comprising a thermoplastic resin. More specifically, with respect to the thermoplastic resin preferably used, there is no particular limitation as long as the thermoplastic resin has fiber-forming properties, but examples of thermoplastic resins include a polyester resin, an acrylic resin, a polyamide resin (nylon), rayon, and cellulose. Of these, from the viewpoint of the balance between the processability and the physical properties of the final products and the like, a polyester resin or a polyamide resin is preferred. Further, from the viewpoint of the stability of quality, physical properties, price and the like, a fiber comprising a polyester resin is preferred.

Especially, examples of polyester resins include polyethylene terephthalate, polyethylene naphthalate, polytrimethylene terephthalate, polybutylene terephthalate, and these resins containing a third component. Examples of third components include cationic-dye dyeable anionic components, e.g., sodium sulfoisophthalate; dicarboxylic acids other than the acid component as a main component, e.g., naphthalenedicarboxylic acid, terephthalic acid, isophthalic acid, adipic acid, and sebacic acid, which are different from the main component; and glycol compounds other than the alkylene glycol as a main component, e.g., one member or more of diethylene glycol, polyethylene glycol, bisphenol A, and bisphenol sulfone. The above-mentioned polyester may be a polyester having biodegradability, such as polylactic acid, or a polyester obtained by material recycling or chemical recycling. Alternatively, the polyester may be a polyester obtained using a catalyst containing a specific phosphorus compound and titanium compound as described in JP-A-2004-270097 and JP-A-2004-211268. Further alternatively, the polyester may be an aliphatic polyester, such as polylactic acid or stereocomplex polylactic acid.

The thermoplastic resin constituting the fiber used in the invention may, if necessary, contain one member or two or more members of a micropore-forming agent, a cationic-dye dyeable agent, a color protection agent, a heat stabilizer, a fluorescent brightener, a matting agent, a coloring agent, a moisture absorbent, and inorganic fine particles.

The fiber powder of the invention has a characteristic feature such that the particle diameter of the fiber powder is not uniform but has a distribution. By using the fiber powder obtained in the invention, it is possible to control the pore size of the finally obtained fiber structure. For example, various pore sizes can be realized by mixing the fiber powder into a heat-resistant material and then removing the fiber powder by calcination or the like. Further, by mixing the fiber powder of the invention into a structure, it is possible to control luster or friction of the surface of the structure.

It is necessary that the fiber powder of the invention have a 50% particle diameter ($d_{50}$; hereinafter, frequently referred to as "$d_{50}$") of 6 to 60 µm. The 50% particle diameter ($d_{50}$) means a so-called median diameter, which is a diameter of the particle at 50% from the smallest in the cumulative distribution of the number of particles. The 50% particle diameter ($d_{50}$) is more preferably in the range of from 8 to 50 µm, further preferably 10 to 40 µm. When the $d_{50}$ is less than 6 µm, the cost for processing tends to be increased. Conversely, when the $d_{50}$ is more 60 µm, it is likely that excellent dispersibility is difficult to obtain.

Further, it is necessary that the fiber powder of the invention have a maximum particle diameter ($d_{100}$), which is the maximum particle diameter of the fiber powder, of 1,000 µm or less. The maximum particle diameter ($d_{100}$) is more preferably 900 µm or less, further preferably in the range of from 80 to 800 µm. When the maximum particle diameter ($d_{100}$) is more than 1,000 µm, excellent dispersibility cannot be obtained.

The value of the particle diameter in the invention is a value representatively indicated by a particle diameter of the maximum portion of each particle, and here is a value of a Feret diameter determined by a dynamic image analysis method (in accordance with ISO 13322-2). The Feret diameter means a value of the gap between two parallel lines which have disposed an image of a particle therebetween. Further, the particle diameter in the invention is substantially a value as measured substantially along the long axis direction of the bent particle in a fibrous form, which corresponds to a so-called maximum Feret diameter (XFe max). With respect to the thus determined particle diameter of each particle, when the particle in a fibrous form is not bent, the particle diameter in the invention is equivalent to the fiber length of the particle, and, when the particle in a fibrous form is bent, the particle diameter is a value smaller than the fiber length of the particle.

With respect to the values of $d_{10}$, $d_{50}$, $d_{90}$, $d_{100}$ and the like, which are the particle diameters in the invention, among the measured values of Feret diameter of the particles, $d_x$ indicates a particle diameter of the particle for the cumulative distribution with the number of x % from the smallest. Specifically, $d_{50}$ is a value of cumulative distribution 50% from the smallest, that is, a so-called median diameter. $d_{100}$ is a value of cumulative distribution 100% from the smallest, that is, the maximum particle diameter.

In the fiber powder of the invention, with respect to the distribution of the particle diameter, the 10% particle diameter ($d_{10}$) is preferably in the range of from 0.5 to 20 µm, further preferably in the range of from 1 to 10 µm. Further, with respect to the distribution of the particle diameter, the 90% particle diameter ($d_{90}$) is preferably in the range of from 10 to 200 µm, further preferably in the range of from 20 to 100 µm.

In the fiber powder of the invention, the $(d_{10} \times d_{90})/d_{100}$ value is preferably 0.3 to 5.0. The $(d_{10} \times d_{90})/d_{100}$ is a parameter showing the ratio of the particles having a shorter fiber length to the particles having a longer fiber length, and can be an index for an appropriate range of the distribution of the fiber length. When the $(d_{10} \times d_{90})/d_{100}$ is too small, the ratio of the particles having a shorter fiber length is small, and, for example, a fiber structure formed using such particles may be difficult to control, which is not preferred. Conversely, when the $(d_{10} \times d_{90})/d_{100}$ is too large, the cost for processing is markedly increased, and thus a commercial advantage cannot be obtained. The values of $d_{10}$, $d_{90}$, and $d_{100}$ have a unit of µm. Further, the values of $d_{10}$ and $d_{90}$ are preferably in the range of from 0.5 to 200 µm, especially preferably in the range of from 1 to 100 µm.

In the fiber powder of the invention, it is preferred that, based on $d_{100}$, the $d_{90}/d_{100}$ value is in the range of from 0.1 to 0.5, or the $d_{50}/d_{100}$ value is in the range of from 0.05 to 0.5. Alternatively, it is preferred that, based on $d_{50}$, the $d_{10}/d_{50}$ value is in the range of from 0.07 to 0.90, or the $d_{90}/d_{50}$ value is in the range of from 1.5 to 2.5.

The fiber powder of the invention is particles derived from a fiber, and is preferably in a fibrous form. Further, when the fiber is a thermoplastic resin, the molecules are preferably oriented in the fiber axis direction. The orientation of the molecules can be caused, for example, by a stretching treatment made in the fiber production process. When the molecules are oriented in the fiber axis direction, the fibrous form can be further surely maintained even after the pulverization treatment.

With respect to a more specific form of the fiber powder of the invention, it is preferred that the fibrous form of a predetermined size derived from the size of the fiber before pulverized is maintained, irrespective of the above-mentioned particle diameter. The diameter of the pulverized fiber used in the invention is preferably 50 µm or less, further preferably in the range of from 0.1 to 20 µm, especially preferably in the range of from 0.2 to 10 µm. With respect to the size of particles of the fiber powder obtained after the pulverization treatment, a measured value of a minimum Martin diameter (Xma min) is equivalent to a value of a diameter of the particle in a fibrous form measured in the short axis direction, and substantially corresponds to the fiber diameter of the fiber before pulverized. The minimum Martin diameter means a length of the shortest segment of line among the lines which divide the projected area in half in the taken image.

As mentioned above, the particle diameter of the fiber powder of the invention has dispersed values. For this reason, the fiber powder of the invention can be in various forms, making it possible to appropriately control the degree of entanglement of the fiber powder. When the particle diameter of the fiber powder is uniform and, for example, the particles have a shape of true sphere, the fiber powder is poor in physical properties improvement effect for entanglement and the like. The fiber powder of the invention has the physical properties improved due to variety in the form.

It is preferred that a surfactant is present on the surface of the fiber powder of the invention. By applying various surfactants, it is possible to improve the dispersibility of the fiber powder in water and the like. The surfactant varies depending on the use, but is preferably a hydrophilic surfactant, especially preferably an ester ether surfactant. It is preferred that the surface of the fiber is chemically processed to be hydrophilic, or a thermoplastic resin having hydrophilicity is used. The amount of the surfactant applied is preferably 0.2 to 3.0% by weight, based on the weight of the fiber powder.

Further, it is preferred that when the fiber powder of the invention is extracted with an organic solvent, the extracted components are in an amount of 0.2 to 3.0% by weight, based on the weight of the fiber powder. With respect to the organic solvent selected for the extraction, preferred is a solvent which is methanol/acetone=50 vol %/50 vol %. The extracted components correspond to the above-mentioned surfactant and the monomer component and oligomer component of the polymer constituting the fiber. When the amount of the extracted components is too small, the dispersibility of the fiber powder in water generally tends to become poor. Conversely, when the amount of the extracted components is too large, it is more likely that, for example, when the fiber powder is dispersed in water, foam is caused in an increased amount and bubbles are incorporated into the dispersion, leading to a product defect.

The fiber powder of the invention preferably has a water content of 0.2 to 50% by weight, more preferably in the range of from 0.3 to 45% by weight, further preferably 0.4 to 40% by weight. When the water content of the fiber powder is too small, the dispersibility of the fiber powder in water or the like tends to become poor. Conversely, when the water content of the fiber powder is too large, the dispersibility is improved, but a negative effect, such as an increase of the transportation cost for the products or the storage and control cost, is increased.

The fiber powder of the invention can be obtained by placing a raw material fiber between a pair of metal rolls which are rotating to subject the raw material fiber to compressive pulverization treatment. For example, the fiber powder can be obtained by subjecting a known fiber to pulverization treatment by a roller press method using a pair of metal rolls. By applying compression and shear force to a fiber using a pair of metal rolls and further tearing the fiber, the fiber powder of the invention having a particle diameter which is not uniform can be obtained.

Further, the raw material fiber used for obtaining the fiber powder of the invention is preferably a synthetic fiber which has been subjected to stretching treatment or the like so that the constituent molecules are oriented in the fiber axis direction. Such fiber can more surely maintain a fibrous form even after the pulverization treatment.

The size of the raw material fiber is preferably in the range of 100 µm at largest or less. Further, the size of the raw material fiber is preferably in the range of from 0.1 to 20 µm, especially preferably 0.2 to 10 µm.

On the other hand, the length of the fiber before processed is not particularly specified, and the fiber may be in a multifilament form, or may be in a form of staple fiber obtained by cutting a multifilament into short one in advance. In a general fiber cutting step, as a fiber before processed, a multifilament which is a continuous fiber is generally used from the viewpoint of the production efficiency and uniformity, but, in the roller press method, preferred is a processing method in which a short fiber dispersion containing water or the like is treated, and there is no particular limitation. When a continuous fiber is selected as a starting material, a need to increase the frequency of the treatment using metal rolls is caused, and therefore, for achieving an efficient treatment of the fiber, it is preferred to cut the continuous fiber into a short fiber in advance. Conversely, from the viewpoint of the handling properties, it is preferred to use a continuous filament which is a continuous fiber.

When the fiber before processed is a short fiber, as a method for cutting a fiber into the short fiber, a method in which a fiber bundle is cut using a known rotary cutter or guillotine cutter is preferably used. The length of the cut fiber before subjected to roller press treatment is preferably in the range of from 0.5 to 20 mm, further preferably 1 to 10 mm.

In the roller press, the raw material fiber is placed between a pair of metal rolls which are rotating to perform compressive pulverization. By performing the compressive pulverization step by roller press, a pair of metal rolls exert a compressive force on the fiber, and further the fiber is stretched in the discharge direction of the rolls due to the rotation of the rolls. After passing the step, the fiber is then torn into a form of short fiber. Subsequently, a pulverization treatment is made, so that the pulverized material can be efficiently pulverized into a powder form without being changed to a cotton form. When such a method is employed, the fiber can be pulverized by only a pulverizing apparatus constructed mainly from a pair of rolls, and therefore the pulverizing facility can be downsized, and further the structure of the apparatus can be simplified.

A step of further finely powdering the pulverized material obtained by the above-mentioned roller press method is preferably performed. As an example of the finely powdering step, there can be mentioned a milling step for further milling the pulverized particles or an ultra-finely powdering step for finely powdering the pulverized particles. The milling step or ultra-finely powdering step can be conducted using various types of known mills. A mill having a function such that the particles can be ultra-finely powdered is preferably employed. As a mill, an apparatus which mills particles by means of a physical effect, such as a shear force, an impact force, or an attrition force, is preferably employed.

Further, the above-mentioned compressive pulverization step for the raw material fiber by roller press is preferably performed repeatedly a plurality of times. When the roller press is performed repeatedly a plurality of times, a procedure may be used in which the pulverized material, which has been once charged into a pulverizing apparatus having a pair of metal rolls, is further charged into the pulverizing apparatus, and the roll compressive pulverization step is performed repeatedly a plurality of times. Alternatively, a continuous step is preferably employed in which one apparatus is provided with two or more pairs of metal rolls and constructed so that the material pulverized by the first pair of metal rolls is charged into the second pair of metal rolls, and the material pulverized by the second pair of metal rolls is further pulverized by the third pair of metal rolls.

By repeatedly performing the compressive pulverization step by roller press a plurality of times, the fiber is torn by stretching in multiple stages, so that a fiber powder having a smaller particle diameter can be obtained. When the step is repeatedly performed, the frequency of the treatment is preferably 5 or more, further preferably 10 or more, especially preferably in the range of from 15 to 100.

In the roller press, a pair of metal rolls preferably compress the fiber at a linear pressure of 0.5 t/cm or more, preferably a pressure of 1 to 10 t/cm. The pressure does not mean an axial force exerted on the axis of one metal roll of a pair of metal rolls but a pressure exerted on the fibrous material in the linear portion along the abutting portion of the metal rolls.

In the step in which the fiber is compressed between the metal rolls, the rotation of the rolls stretches the fiber, so that the obtained fiber powder is improved in the physical properties, and thus a more efficient treatment method can be achieved.

Further, in the compressive pulverization step by roller press, it is preferred that water is added upon charging the fiber. The amount of the water added may be appropriately selected according to the amount of the charged material to be pulverized, but, generally, as a yardstick, the amount of the water added is advantageously about 2 to 10% by weight, based on the amount of the charged fiber. By adding water, lubrication of the fiber is appropriately suppressed, making it possible to improve the pulverization efficiency for the fiber.

The raw material fiber used in the invention is consequently cut into short one by the roller press method. For obtaining an intended fiber particle diameter distribution, it is preferred that the fiber is repeatedly passed through the roller press apparatus. Further, as a method for further finely powdering the fiber aggregate which has been passed through the roller press apparatus, a mill, such as a screen mill, a turbo-mill, a bead mill, a ball mill, an oscillating ball mill, a roller mill, a centrifugal classification type mill, a hammer mill, or a jet mill, is preferably employed. By employing a plurality of such mills, a fiber powder having a particle diameter more suitable for the purpose can be obtained.

The raw material fiber used in the invention is preferably formed from an organic material like the obtained fiber powder. The raw material fiber is especially preferably a synthetic fiber formed from as a raw material a synthetic resin which is easy to pulverize. Such a synthetic fiber can be obtained by a known method, and a spinning or stretching method enables the synthetic fiber to be easily pulverized. More specifically, the synthetic fiber is a fiber comprising, for example, the above-mentioned polyester resin, acrylic resin, polyamide (nylon) resin, rayon, cellulose, or the like. Further, from the viewpoint of the stability of quality, physical properties, price and the like, a fiber comprising a polyester resin is preferred, and particularly, preferred is polyethylene terephthalate, polyethylene naphthalate, polytrimethylene terephthalate, polybutylene terephthalate, or these resins containing a third component.

The fiber powder of the invention formed from an organic material is further preferably a fiber powder which suffers thermal decomposition when heated to a high temperature. Further, utilizing such properties, the fiber powder is preferably used as a pore-forming material or a porous material forming agent. For example, a (porous) structure having a number of pores formed therein can be easily produced by mixing the fiber powder of the invention into a heat-resistant inorganic material, such as a metal or a ceramic, and then calcining the resultant mixture.

Particularly, the fiber powder of the invention is long in the direction of the fiber axis, and therefore the direction of pores having a thin and long shape can be controlled by arrangement of the fiber powder. By controlling the direction of the pores, for example, not only can gas permeability of the material be enhanced, but also a direction property can be imparted to the gas permeability. For example, a porous structure can be produced by mixing the above-mentioned fiber powder of the invention and an inorganic material and forming the resultant mixture, and then calcining the formed material at a temperature at which the fiber powder suffers thermal decomposition or higher. More specifically, when the fiber powder of the invention is mixed into an inorganic material preferably in a particulate form, such as a metal or a ceramic, which constitutes a formed article, and calcined, the formed article is increased in strength and further, after removing the fiber powder comprising an organic material, a porous structure can be formed. Especially when the fiber powder of the invention is formed from an organic material, the fiber powder is preferably used as the pore-forming material. Further, for using the fiber powder in such an application, the thermal decomposition temperature of the fiber powder is preferably in the range of 600° C. or lower, especially preferably in the range of from 200 to 500° C.

The fiber powder of the invention can be used as a pore-forming material as mentioned above, and is suitably used in various applications, such as an abrasive material and an electrode.

A fine fiber aqueous dispersion which is another embodiment of the invention has dispersed in water the fiber powder of the invention obtained by the above-mentioned method or the like.

The fiber powder of the invention has variety in the form of particles, and has excellent dispersibility in water. Therefore, due to this effect, the fiber powder is very useful in improving the performance in various applications, such as cosmetics, coating compositions, and various reinforcing materials. Further, the fine fiber aqueous dispersion comprising the fiber powder of the invention contains the above-mentioned fiber powder, and therefore has excellent dispersibility in water, and the dispersibility is stable. For example, the fine fiber aqueous dispersion of the invention can be applied to a film or the like, and used in applications, such as a spacer, a functional agent, and an anticoagulant. Further, by adding the fiber powder of the invention in the form of a fine fiber aqueous dispersion to a structure in a sheet form, it is possible to easily control the pore diameter, air permeability, and the like of the structure. The fiber powder of the invention and an ultrafine fiber aqueous dispersion thereof are advantageously used in such a structure controlling material application, and other applications, such as cosmetics, coating compositions, and various reinforcing materials.

EXAMPLES

Hereinbelow, the present invention will be described in more detail with reference to the following Examples and Comparative Examples, which should not be construed as limiting the scope of the invention. With respect to the items for measurement in the following Examples, the measurements were conducted by the methods described below.

(1) Length and Size of a Raw Material Fiber

Using a scanning electron microscope (SEM), a fiber was laid on a base, and the whole of the fiber was observed at a magnification of 20 to 500 times, and, using the measurement function of the SEM, 200 single filaments were measured to determine a length and a size of the raw material fiber.

(2) Particle Size Distribution $d_{10}$, $d_{50}$, $d_{90}$, $d_{100}$ 0.06 g of the obtained fiber powder was added to 70 ml of purified water, and a surfactant was added and the resultant mixture was stirred and then, before the dispersed fiber powder suffered sedimentation to be classified, the measurement was made by a dynamic image analysis method (in accordance with ISO 13322-2). As a measuring apparatus, a particle measuring instrument "CAMSIZER XT (X•Flow)" (manufactured by Verder Scientific Co., Ltd.) was used, and a particle diameter was determined in terms of a number cumulative distribution of the maximum Feret diameter. $d_{10}$ is a value of number cumulative distribution 10%, $d_{50}$ is a value of number cumulative distribution 50% (median diameter), $d_{90}$ is a value of number cumulative distribution 90%, and $d_{100}$ is a value of number cumulative distribution 100% (maximum diameter). The limit of detection of the apparatus is 0.001%=10 ppm.

(3) Extracted Component Amount

From 10 g of an ultrafine flattened short fiber, an extractable component was extracted using an organic solvent (solvent of methanol/acetone=50 vol %/50 vol %) by heating under reflux by means of a Soxhlet's extractor for 90 minutes, and, from a weight of the resultant dried material, an extracted component amount was calculated using the following formula.

Extracted component amount (% by weight)= (Weight (g) of the dried material/Weight (g) of the fiber powder before extraction)×100

(4) Water Content 5 g of the fiber powder was dried at 150° C. for one hour, and then a weight of the resultant fiber powder was measured. A water content was calculated from the following formula.

Water content (%)=((Weight (g) before heating−Weight (g) after heating)/Weight (g) after heating)×100

(5) Dispersibility in Water 0.06 g of the fiber powder was placed in a 100-ml vessel, and 70 ml of purified water was added to the fiber powder and the vessel was vertically shaken 5 times and then, the resultant dispersion was checked as to whether or not an aggregated material or deposited material was observed to judge the dispersibility in water.

○: No aggregated material is found and excellent.

Δ: The supernatant is dispersed, but an aggregated material or deposition of the undispersed material in a slight amount is observed.

X: An aggregated material or deposition of the undispersed material in a large amount is observed.

(6) Foaming Property

Like the item (5) above, 0.06 g of the fiber powder was placed in a 100-ml vessel, and 70 ml of purified water was added to the fiber powder and the vessel was vertically shaken 5 times and then, the resultant dispersion was checked as to whether or not the generated foam disappeared to judge the foaming property according to the following criteria.

○: Foam immediately disappears.

Δ: Foam disappears in 10 seconds or less.

X: Foam does not disappear for one minute or longer.

Example 1

As a starting material, a polyethylene terephthalate fiber (diameter: 4 μm; length: 3 mm; manufactured by Teijin Limited), which has the molecules oriented in the fiber axis direction by stretching, and which has been cut into a short fiber, was prepared. Using a roller press apparatus (manufactured by Seishin Enterprise Co., Ltd.; roll diameter: 300 mm; roll length: 300 mm), the short fiber was passed through the roller press apparatus 50 times under conditions at a linear pressure of 2 tons/cm while adding pure water in an amount of 5% by weight, based on the fiber weight, per five frequencies of passing the fiber through the apparatus, obtaining a fibrous material. Then, the obtained fibrous material was opened using a jet milling apparatus STJ-200 (manufactured by Seishin Enterprise Co., Ltd.; air pressure: 0.7 MPa; throughput: 6 kg/hr) to obtain a fiber powder. The physical properties of the obtained fiber powder are shown in Table 1.

Further, the obtained fiber powder in an amount of 1 wt % and aluminum oxide in an amount of 99 wt % were mixed together and the resultant powder was formed under a pressure of 50 to 3,000 kg/cm², and then finally calcined at 700 to 1,700° C. to obtain a porous formed article. The thermal decomposition temperature of the fiber powder was lower than 500° C., and, when the temperature was increased to 500° C. or higher, the fiber powder was completely thermally decomposed and disappeared. Despite having pores derived from the fiber powder formed in the surface and inside, the formed article had a stable shape.

Example 2

A fiber was processed under substantially the same conditions as in Example 1 except that the frequency of passing the fiber through the roller press apparatus was changed from 50 to 25, obtaining a fiber powder. The physical properties of the obtained fiber powder are shown in Table 1.

The obtained fiber powder (extracted component amount: 0.7% by weight) was treated at 150° C. for one hour, and, as a result, the extracted component amount was 0%, but the dispersibility in water was slightly poor.

A roller press treatment was conducted under the conditions in Example 2 using the polyethylene terephthalate fiber as a starting material, which had been washed with water to remove the surfactant on the surface. As a result, the foaming property was improved, but the dispersibility in water was slightly lowered. In this case, the extracted component amount was 0.1% by weight.

Meanwhile, using the polyethylene terephthalate fiber as a starting material, which had an increased amount of the surfactant on the surface by adding an oil, a roller press treatment was conducted. As a result, the dispersibility in water was improved, but the foaming property became slightly poor. In this case, the extracted component amount was 3.6% by weight.

Example 3

A fiber was processed under substantially the same conditions as in Example 1 except that the frequency of passing the fiber through the roller press apparatus was changed from 50 to 18, obtaining a fiber powder. The physical properties of the obtained fiber powder are shown in Table 1.

Comparative Example 1

A fiber was processed under substantially the same conditions as in Example 1 except that the frequency of passing the fiber through the roller press apparatus was changed from 50 to 3, obtaining a fiber powder. The physical properties of the obtained fiber powder are shown in Table 1.

Comparative Example 2

As a starting material, a continuous fiber bundle of a polyethylene terephthalate fiber (diameter: 4 μm; manufactured by Teijin Limited) before being cut, which corresponds to the starting material in Example 1 before cut into a short fiber, was prepared. First, the fiber bundle was cut as such using a guillotine cutter, and, as a result, the fiber bundle could be stably cut into only a length as large as 400 μm.

Separately, water was applied to the fiber bundle and frozen, and the fiber bundle contained in an ice column was cut. As a result, a fiber material cut into 100 μm was obtained. The physical properties of the obtained fiber material are shown in Table 1. The fiber distribution was uniform, and the dispersibility in water was slightly poor.

TABLE 1

|  | Example 1 | Example 2 | Example 3 | Comparative Example 1 | Comparative Example 2 |
|---|---|---|---|---|---|
| Particle diameter of fiber powder | | | | | |
| $d_{10}$ (μm) | 8.1 | 5.1 | 2.9 | 2.5 | 88.1 |
| $d_{50}$ (μm) | 13.6 | 22.4 | 29.5 | 38.5 | 95.4 |
| $d_{90}$ (μm) | 30.2 | 46.0 | 66.0 | 106.1 | 112.0 |
| $d_{100}$ (μm) | 126.0 | 231.0 | 368.0 | 1223.0 | 124.0 |
| $(d_{10} \times d_{90})/d_{100}$ | 1.94 | 1.02 | 0.52 | 0.22 | 79.6 |
| Extracted component amount (wt %) | 0.8 | 0.7 | 0.8 | 0.9 | 0.6 |
| Water content (%) | 0.9 | 1.0 | 0.9 | 1.1 | 1.2 |
| Foaming property | ○ | ○ | ○ | ○ | ○ |
| Dispersibility in water | ○ | ○ | ○ | X | Δ |

The invention claimed is:

1. A fiber powder having a 50% particle diameter ($d_{50}$) of 10 to 60 μm and having a maximum particle diameter ($d_{100}$) of 80 to 1,000 μm;
    wherein said fiber powder is in a fibrous form and is derived from a fiber,
    wherein the fiber is a thermoplastic resin, and
    wherein molecules of the thermoplastic resin are oriented in a fiber axis direction.

2. The fiber powder according to claim 1, wherein a value (($d_{10} \cdot d_{90})/d_{100}$) obtained by dividing by the maximum particle diameter ($d_{100}$) a value which is obtained by multiplying a 10% particle diameter ($d_{10}$) by a 90% particle diameter ($d_{90}$) is 0.3 to 5.0.

3. The fiber powder according to claim 1, which has an extractable component content of 0.2 to 3.0% by weight based on the fiber powder weight;
    wherein the extractable component is extracted using an organic solvent by heating under reflux.

4. The fiber powder according to claim 1, which has a water content of 0.2 to 50% by weight.

5. The fiber powder according to claim 1, wherein the thermoplastic resin is a polyester resin or a polyamide resin.

6. The fiber powder according to claim 2, which has an extractable component content of 0.2 to 3.0% by weight based on the fiber powder weight;
    wherein the extractable component is extracted using an organic solvent by heating under reflux.

* * * * *